United States Patent [19]

Hoseki et al.

[11] Patent Number: 5,540,974

[45] Date of Patent: Jul. 30, 1996

[54] METALLIZED POLYESTER FILM CAPACITOR

[75] Inventors: Yoshitaka Hoseki, Hikone; Shuji Anno, Odawara; Shin-ichi Kinoshita, Tokyo, all of Japan

[73] Assignee: Diafoil Hoechst Company, Limited, Tokyo, Japan

[21] Appl. No.: 165,695

[22] Filed: Dec. 13, 1993

[30] Foreign Application Priority Data

Dec. 15, 1992 [JP] Japan .................................. 4-334531

[51] Int. Cl.$^6$ .............................. B32B 7/02; B32B 15/08; B32B 27/36; H01G 4/06
[52] U.S. Cl. ...................... 428/141; 361/323; 428/213; 428/215; 428/216; 428/323; 428/336; 428/423.7; 428/458; 428/461; 428/463; 428/480; 428/483
[58] Field of Search .................................. 428/141, 213, 428/215, 216, 323, 336, 423.7, 458, 480, 483, 461, 463; 361/323

[56] References Cited

U.S. PATENT DOCUMENTS 5,089,347  2/1992  Hart ............................... 428/461

FOREIGN PATENT DOCUMENTS 0484956  5/1992  European Pat. Off. .
52072458  12/1975  Japan .

*Primary Examiner*—D. S. Nakarani
*Attorney, Agent, or Firm*—Foley & Lardner

[57] ABSTRACT

Disclosed herein is a metallized polyester film capacitor comprising:

a polyester film;

a coating layer formed on at least one side of said polyester film, said coating layer having a thickness (t) of 0.01 to 2 μm and containing 0.1 to 20 wt % of the particles having an average diameter (D) that satisfies the following formula (I); and a metal layer deposited on at least one side of the polyester film having said coating layer.

$$0.5 \leq D/t \leq 3 \qquad (I)$$

20 Claims, No Drawings

METALLIZED POLYESTER FILM CAPACITOR

BACKGROUND OF THE INVENTION

The present invention relates to a metallized polyester film capacitor. Particularly, it relates to a metallized polyester film capacitor showing an enhanced adhesion between a base film and a deposited metal layer, and having an excellent moist heat resistance.

Polyester films, a typical example of which is polyethylene terephthalate film, are popularly used as base film for capacitors because of their excellent mechanical properties, heat resistance and electrical properties.

However, with the recent development of electronic devices, the polyester films have been required to have high performances. One of acute requirements in connection to such high performances is long-term stability to moist heat resistance. The metallized polyester films had the disadvantage of poor adhesion property between base film and deposited metal, especially under a high-temperature and high-humidity use environment. Therefore, the conventional metallized polyester film capacitors had the problem that although sheathed with an epoxy resin to a sufficient thickness, they would allow moisture penetrates at the interface between base film and deposited metal layer in the capacitor when they are left under a high-temperature and high-humidity condition for a long time, and this would cause corrosion of the metallized electrodes and large decline of capacitance. Thus, an improvement of moist heat resistance of the capacitors has been required for their long-term stabilized performance.

As an approach to such improvement, a method has been proposed in which instead of the coating with a low-viscosity epoxy resin under the atmospheric pressure, such coating-treatment is carried out under reduced pressure so that the treated resin would penetrate deep into the inside of the capacitor element by virtue of the difference in pressure vis-a-vis atmospheric pressure. This method, however, involves some serious problems. That is, the low-viscosity epoxy resin may be foamed under reduced pressure and may deposit on the lead wires, so that when it is tried to solder the capacitor devices to a printed wiring board, they may fail to be properly soldered on the board. Also, the above coating-treatment tends to weaken the self-healing of the film when a characteristic overvoltage of the plastic film capacitors is applied, and consequently the dielectric strength of the capacitor may be lowered.

The present inventors found that a polyester film having a coating layer composed of at least one of resins selected from polyester-based resins, polyurethane-based resins and polyacrylic-based resins, has a high adhesion properties of moist heat resistance to the deposited metal film, and that a capacitor device made by using such a metallized polyester film is possessed of high moist heat resistance in practical uses.

It is to be pointed out, however, that a polyester film coated with the said adhesive resin is excessively inferior in workability in the capacitor manufacturing process as compared with that of the conventional noncoated polyester films, specifically at the steps of depositing an electrode metal on the film, slitting of the film and winding-up of the metallized polyester film. It is to be further noted that with a recent tendency toward miniaturization of electronic devices, endeavors have been made for reducing thickness of the polyester films used as a dielectric for capacitors, and now improvement of film workability in the capacitor manufacturing process has become a matter of paramount importance.

As a result of the present inventors' studies to solve the above technical problems, it has been found that a film capacitor produced by using a metallized polyester film obtained by forming on at least one side of a polyester film a coating layer having a thickness (t) of 0.01 to 2 μm and containing 0.1 to 20 wt % of the particles which satisfy the formula: $0.5 \leq D/t \leq 3$ (D: average particle diameter), and depositing a metal on at least one side of the said coated polyester film, is excellent in adhesion between the polyester film as a base film and the deposited metal layer and high in moist heat resistance, and also has excellent electrical properties and good workability in the capacitor production. The present invention was attained on the basis of this finding.

SUMMARY OF THE INVENTION

An object of the present invention is to provide a metallized polyester film capacitor having excellent electrical properties and capable of miniaturization, light-weight and low-production cost without lowering workability in the manufacture of the capacitor.

Another object of the present invention is to provide a metallized polyester film capacitor having long-term stability to moist heat resistance and excellent dielectric properties, and also capable of inhibiting a lowering of capacitance.

To achieve the above-mentioned aims, in a first aspect of the present invention, there is provided a metallized polyester film capacitor comprising a polyester film, a coating layer formed on at least one side of the said polyester film, having 0.01 to 2 μm in thickness (t) and containing 0.1 to 20 wt % of the particles having an average diameter (D) satisfying the formula: $0.5 \leq D/t \leq 3$, and a metal film deposited on at least one side of the said coated polyester film.

DETAILED DESCRIPTION OF THE INVENTION

The "polyester" in the polyester film used in the present invention is polyethylene terephthalate in which not less than 80 mol % of the structural units thereof is composed of ethylene terephthalate; polyethylene naphthalate in which not less than 80 mol % of the structural units thereof is composed of ethylene naphthalate; or poly-1,4-cyclohexanedimethylene terephthalate in which not less than 80 mol % of the structural units thereof is composed of 1,4-cyclohexanedimethylene terephthalate. As the copolymer components other than the above-mentioned primary components, there can be used, for example, diols such as diethylene glycol, propylene glycol, neopentyl glycol, polyethylene glycol and polytetramethylene glycol; dicarboxylic acids such as isophthalic acid, 2,6-naphthalenedicarboxylic acid, 5-sodiumsulfoisophthalic acid, adipic acid, azelaic acid, sebacic acid and ester-forming derivatives of these acids; and oxymonocarboxylic acids such as oxybenzoic acid and its ester-forming derivatives.

The polyester film used in the present invention may contain the additive particles, deposited particles or other catalyst residues which can form proper protuberances on the film surface in an amount which does not deteriorate the capacitor performance and properties described later. The content of the additive particles is not more than 0.8 wt %, preferably not more than 0.5 wt %, more preferably not more than 0 25 wt % still more preferably not more than 0.1 wt %. In case where the content thereof is too large, since voids are formed near the inert particles in the film, the high content of particles adversely affects the dielectric properties of the film.

As the additives other than the above-mentioned protuberance-forming agent, an antistatic agent, a stabilizer, a lubricant, a crosslinking agent, an anti-blocking agent, an antioxidant, a coloring agent, a light shielding agent, an ultraviolet absorber and the like may be contained in the film in the amount of which does not deteriorate the capacitor performance and properties.

The polyester film of the present invention may be of a multi-layer structure as far as the finally obtained properties satisfy the requirements of the present invention. In the case of a multi-layer structure, certain layer(s) thereof may be composed of material(s) other than the polyester mentioned above.

The coating layer on the polyester film of the present invention can be obtained by applying on a base film a particle-containing coating solution mainly composed of a water-soluble and/or water-dispersible resin, and drying the coating formed on the base film. The water-soluble and/or water-dispersible resins usable in the present invention include various kinds of resins such as polyesters, polyamides, polystyrenes, polycarbonates, polyarylates, polyacrylics, polyvinyl chlorides, polyvinyl butyrals, polyvinyl alcohols, phenoxy resin polyamides, epoxy-based resins, polyurethanes and silicone-based resins, and the copolymers obtained from monomer(s) thereof or mixtures of these resins. Of these resins, polyesters, polyurethanes and potyacrylics are especially preferred.

As the components of the polyester-based resins usable in the present invention, the polyvalent carboxylic acids and polyvalent hydroxyl compounds can be exemplified. As the polyvalent carboxylic acids, terephthalic acid, isophthalic acid, orthophthalic acid, phthalic acid, 4,4'-diphenyldicarboxylic acid, 2,5-naphthalenedicarboxylic acid, 2,6-naphthalenedicarboxylic acid, 1,4-cyclohexanedicarboxylic acid, 2-potassiumsulfoterephthalic acid, 5-sodiumsulfoisophtbalic acid, adipic acid, azelaic acid, sebacic acid, dodecanedicarboxylic acid, glutaric acid, succinic acid, trimellitic acid, trimesic acid, trimellitic acid anhydride, phthalic anhydride, phydroxybenzoic acid, trimellitic acid monopotassium salt and their ester-forming derivatives may be exemplified. As the polyvalent hydroxyl compounds, ethylene glycol, 1,2-propylene glycol, 1,3-propylene glycol, 1,3-propanediol, 1,4-butanediol, 1,6-hexanediol, 2-methyl-1,5-petanediol, neopentyl glycol, 1,4-cyclohexanedimethanol, p-xylene glycol, bisphenol A-ethylene glycol addition product, diethylene glycol, triethylene glycol, polyethylene glycol, polypropylene glycol, polytetramethylene glycol, polytetramethylene oxide glycol, dimethylolpropionic acid, glycerin, trimethylolpropane, sodium dimethylolethylsulfonate, and potassium dimethylolpropionate may be exemplified. One or more are selected from these compounds and subjected to ordinary polycondensation reaction to synthesize a polyester resin.

As the components of the polyurethane-based resins usable in the present invention, the polyols, polyisocyanates, chain-lengthening materials and crosslinking agents can be exemplified.

As the polyols, polyethers such as polyoxyethylene glycol, polyoxypropylene glycol, polyoxypropylene triol and polyoxytetramethylene glycol; polyesters such as polyethylene adipate, polyethylene-butylene adipate, polypropylene adipate, polyhexylene adipate and polycaprolactam; acrylic-based polyols; and castor oil may be exemplified.

As the polyisocyanates, aromatic diisocyanates such as tolylene diisocyanate, phenylene diisocyanate, 4,4'-diphenylmethane diisocyanate and 1,5-naphthalene diisocyanate; and aliphatic diisocyanates such as xylilene diisocyanate, hexamethylene diisocyanate, lysine diisocyanate, 4,4'-dicyclohexylmethane diisocyanate and isophorone diisocyanate may be exemplified.

As the chain-lengthening materials and crosslinking agents, ethylene glycol, propylene glycol, butanediol, hexanediol, diethylene glycol, trimethylolpropane, glycerin, hydrazine, ethylenediamine, diethylenetriamine, 4,4'-diaminodiphenylmethane, 4,4'-diaminodicyclohexylmethane and water may be exemplified.

The polyacrylic resin used in the present invention is preferably one of which main component is an alkyl acrylate or an alkyl methacrylate. It is preferably a water-soluble or water-dispersible resin comprising 30 to 90 mol % of the said component and 70 to 10 mol % of a vinyl monomer copolymerizable with the said component and having a functional group.

The vinyl monomer copolymerizable with alkyl acrylate or alkyl methacrylate is preferably one having a functional group which serves for enhancing adhesion property between the coating layer and polyester film, and between the coating layer and deposited metal layer, or bettering affinity with other coating material. Preferred examples of such functional group are carboxyl group or its salts, acid anhydride group, sulfonic group or its salts, amide group or hydroxyalkylted amide group, amino group (including substituted amino group) or hydroxyalkylated amino group or its salts, hydroxyl group and epoxy group. Especially preferred are carboxyl group or its salts, hydroxyl group and epoxy group. Two or more kinds of these groups may be contained in the resin.

Examples of alkyl group in the said alkyl acrylate or alkyl methacrylate may include methyl, n-propyl, isopropyl, n-butyl, isobutyl, 2-ethylhexyl, lauryl, stearyl and cyclohexyl. As the vinyl monomer having a functional group copolymerizable with the said alkyl acrylate or alkyl methacrylate, there can be used the following compounds having a functional group such as reactive functional group, self-crosslinking functional group or hydrophilic functional group.

As the compounds having a carboxyl group or a salt thereof or an acid anhydride group, acrylic acid, methacylic acid, itaconic acid, maleic acid, metal salts such as sodium salt or ammonium salts of these carboxylic acids, and maleic anhydride may be exemplified.

As the compounds having a sulfonic group or a salt thereof, vinylsulfonic acid, styrenesulfonic acid, and metal salts such as sodium or ammonium salts of these sulfonic acids may be exemplified.

As the compounds having an amide group or a hydroxyalkylated amide group, acrylamide, methacrylamide, N-methyl methacrylamide, hydroxymethylated acrylamide, hydroxymethylated methacrylamide, ureido-vinyl ether, β-ureido-isobutylvinyl ether and ureidoethyl acrylate may be exemplified.

As the compounds having an amino group or a hydroxyalkylated amino group or a salt thereof, diethylaminoethylvinyl ether, 2-aminoethylvinyl ether, 3-aminopropylvinyl ether, 2-aminobutylvinyl ether, dimethylaminoethyl methacrylate, dimethylaminoethylvinyl ether, and ethers having a group obtained by hydroxymethylating an amino group or making an amino group quaternary with alkyl halide, dimethylsulfonic acid, sultone or the like may be exemplified.

As the compounds having a hydroxyl group, β-hydroxyethyl acrylate, β-hydroxyethyl methacrylate, β-hydroxypropyl acrylate, β-hydroxyypropyl methacrylate, β-hydroxyvinyl ether, 5-hydroxypentylvinyl ether, 6-hydroxyhexylvinyl ether, polyethylene glycol monoacrylate, polyethylene glycol monomethacrylate, polypropylene glycol monoacrylate and polypropylene glycol monomethacrylate may be exemplified.

As the compounds having an epoxy group, glycidyl acrylate and glycidyl methacrylate may be exemplified.

Beside the above compounds, it is also possible to jointly use the compounds such as acrylonitrile, styrenes, butylvinyl ether, maleic acid mono- or dialkyl ester, fumaric acid mono- or dialkyl ester, itaconic acid mono- or dialkyl ester, methyl vinyl ketone, vinyl chloride, vinylidene chloride, vinyl acetate, vinylpyridine, vinylpyrrolidone, vinyltrimethoxysilane and the like. The compounds usable are not limited to those mentioned above.

In the present invention, it is preferable in the viewpoint of safety and hygiene that a polyester-based resins, polyurethane-based resins or polyacrylic-based resins be prepared into a coating solution using water as a medium, but an organic solvent may be contained as an assistant of water-soluble or water-dispersible resin within scope which does not exert bad influence upon the safety and hygiene.

In case of using water as medium, the coating solution may be one prepared by forcibly dispersing such resin with a surfactant or other agent, but preferably the coating solution is prepared by using a self-dispersion type resin having a hydrophilic nonionic component such as polyethers or a cationic group such as quaternary ammonium salt, more preferably using a water-soluble or water-dispersible resin having an anionic group. The "water-soluble or water-dispersible resin having an anionic group" used in the present invention is ones obtained by bonding a compound having an anionic group to skeleton resin by means of copolymerization or grafting. The anionic group may be properly selected from sulfonic acid, carboxylic acid, phosphoric acid and their salts.

For imparting water solubility to the resin, the counter ion of the anionic group used in the present invention is preferably an alkali metal ion, but in view of moist heat resistance of the capacitor described later, such counter ion is more preferably selected from the amine-based onium ions including ammonium ion. The content of the anionic group in the water-soluble or water-dispersible resin having an anionic group is preferably in the range of 0.05 to 8% by weight. When the content of the anionic group is less than 0.05% by weight, water solubility or water dispersibility of the resin tends to deteriorate, while when the content of said group exceeds 8% by weight, there may arise the problems such as deterioration of water resistance of the undercoat layer (coating layer), sticking of the superposed films to each other as a result of moisture absorption, or lowering of adhesiveness in a high-temperature and high-humidity atmosphere.

The thickness of the coating layer is in the range of 0.01 to 2 μm, preferably 0.02 to 1 μm, more preferably 0.03 to 0.2 μm (expressed as final dry thickness). It is preferable to reduce the thickness of the coating layer for meeting the request for miniaturization of the capacitor. However, when the thickness of the coating layer is less than 0.01 μm, the coating nonuniformity tends to occur in the coated polyester film as it is hard to obtain a uniform coating layer. When the thickness of the coating layer exceeds 2 μm, it is difficult to miniaturize the capacitor.

In the present invention, the particles with a size in a specified range are contained in the coat for improving film workability in the capacitor manufacturing process.

The average diameter D (μm) of the particles contained in the coating layer needs to satisfy the formula: $0.5 \leq D/t \leq 3$, preferably $0.7 \leq D/t \leq 2.5$, more preferably $0.8 \leq D/t \leq 2$, wherein t represents the thickness (μm) of the coating layer. When the D/t ratio is less than 0.5, there becomes to be produced no desired effect of improving film workability in the capacitor manufacturing process. When the D/t ratio exceeds 3, there become to take place a lowering of capacitor performance due to fall-out of the particles. The content of the particles in the coating layer is in the range of 0.1% to 20% by weight, preferably 0.5% to 15% by weight, more preferably 1% to 10% by weight. When the particle content is less than 0.1% by weight, the effect of improving film workability in the capacitor producing process, especially in winding-up of the deposited film of the capacitor in contact with the coating layer, becomes unsatisfactory. When the particle content exceeds 20% by weight, there becomes to take place a lowering of capacitor performance due to fall-out of the particles.

Both inorganic particles and organic particles can be used as the particles to be contained in the coating layer. As the inorganic particles, silica, silica sol, alumina, alumina sol, zirconium sol, kaolin, talc, calcium carbonate, calcium phosphate, titanium oxide, barium sulfate, carbon black, molybdenum sulfide, antimony oxide sol and the like can be used. As the organic particles, there can be used, for example, the fine particles composed of the homopolymers or copolymers such as polystyrenes, polyethylenes, polyamides, polyesters, polyacrylic acid esters, epoxy resins, polyvinyl acetate, polyvinyl chloride and the like, which may or may not contain a crosslinking agent, and the fine particles of silicone resins, fluorine resins and the like. The organic particles used in the present invention are preferably the crosslinked polymer particles which are highly resistant to thermal deformation. As the crosslinked polymer particles, there can be used, for example, the particles composed of a copolymer of a monovinyl compound having one aliphatic unsaturated bond in the molecule and a compound having two or more aliphatic unsaturated bonds in the molecule. Also, as a resin other than the crosslinked polymers, thermoserring phenol resins, thermosetting epoxy resins, thermosetting urea resins and benzoguanamine resins may be exemplified. The organic particles used in the present invention may be of a multi-layer structure.

The shape of the particles used in the present invention may be spherical, lumpy, flat or of other configurations. The particle size distribution of the particles used in the present invention is preferably close to that of the monodisperse system. The particle size distribution factor is preferably less than 1.60, more preferably less than 1.50, even more preferably less than 1.40. The "particle size distribution factor" is here defined by $D_{25}/D_{75}$ ($D_{25}$ and $D_{75}$ represent the diameters (μm) of the particles corresponding to cumulative volumes of 25% and 75% respectively, of the total volume of the particles, as integrated from the larger particle side).

The coating solution used in the present invention may contain isocyanate-based compounds, epoxy-based compounds, amine-based compounds, aziridine compounds, silane coupling agents, titanium coupling agents, zircoaluminate-based coupling agents, peroxides, heat and light reactive vinyl compounds, photosensitive resins or the like as a crosslinking agent for improving a sticking property (blocking property), a water resistance, a solvent resistance and a mechanical strength of the coating layer. The coating solution may also contain where necessary a defoaming agent, coaterbility improving agent, thickening agent, antistatic agent, organic lubricant, antioxidant, ultraviolet absorber, foaming agent, dye, pigment and the like.

The alkali metal content in the coating solution is preferably not higher than 1,000 ppm, more preferably not higher than 500 ppm, even more preferably not higher than 200 ppm in the solids of the coating solution. A high alkali metal content in the coating solution tends to deteriorate moist heat resistance of the product capacitor. It is inevitable that alkali metals are contained in the coating solution as impurities in the industrial production process from synthesis of starting materials to preparation of the coating solution. Commercially available service water or ground water is often used for preparing the coating solution. Also, it is common practice for water solubilization of resin to use an alkali metal as a counter ion of the hydrophilic functional group of an anionic resin which is preferably used in the present invention. In some cases, therefore, a preferably coating solution is obtained by applying a deionization treatment.

For applying a coating solution on a polyester film, there can be used a method in which the coating solution is applied outside the biaxially stretched polyester film producing process by using an appropriate coating device such as reverse roll coater, gravure coater, rod coater, air doctor coater, etc., shown and described in Y. Harasaki: Coating Systems, published by Maki Shoten, 1979, or a preferable method in which coating is carried out within the film producing process. As a method of applying the coating solution in .the film producing process, a method of (i) applying the coating solution on a non-stretched polyester film and biaxially stretching the coated polyester film either successively or simultaneously; (ii) applying the coating solution on a monoaxially stretched polyester film and then stretching the obtained polyester film in the direction orthogonal to the initial monoaxial stretching direction; or (iii) applying the coating solution on a biaxially stretched polyester film, and further stretching the obtained polyester film in the transverse direction and/or machine direction.

In the present invention, the said film stretching is carried out at a temperature preferably in the range of 60° to 180° C., and the stretch ratio is not less than 4 times, preferably 6 to 20 times (expressed as an area ratio). The stretched film is heat-treated at a temperature of 150° to 250° C. The thus treated film is preferably relaxed 0.2% to 20% in the machine and/or transverse directions in the maximal temperature zone of the heat-treatment and/or in the cooling zone at the outlet of the heat-treating station. It is especially advantageous to employ a process in which the coating solution is applied on a monoaxially stretched polyester film which has been stretched 2 to 6 times at a temperature of 60° to 180° C. by roll stretching; and after drying in an appropriate way or without drying, the said coated monoaxially stretched polyester film is immediately stretched 2 to 6 times at a temperature of 80° to 130° C. in the direction orthogonal to the initial monoaxial stretching direction; and then the stretched polyester film is heat-treated at a temperature of 150° to 250° C. for 1 to 600 seconds. According to this method, the coating can be dried in the course of stretching and also the thickness of the coating layer can be reduced correspondingly to the stretch ratio, so that it is possible to produce a film suited for use as a polyester base film at relatively low cost.

In the present invention, either one side or both sides of a polyester film may be coated. In case only one side is coated, a coating layer made of a composition different from that of the coating solution of the present invention may be formed on the opposite side to impart other properties to the polyester film of the present invention.

A chemical treatment or a discharge treatment may be applied on the polyester film for improving the coating properties of the film or adhesiveness of the coating layer to the film. Also, a discharge treatment may be applied to the formed coating layer for improving the coating properties and adhesiveness of the coating layer to the biaxially stretched polyester film used in the present invention.

The waterdrop contact angle between a waterdrop and the coating layer is preferably not less than 60°. When the said contact angle is less than 60° waterproof adhesiveness of the film to the metal deposited film is deteriorated, making it hardly possible to impart desired moist heat resistance to the capacitor of the present invention. Therefore, an attention should be paid to the amounts of hydrophilic group, emulsifier and hydrophilic compound in the coating composition.

The center line average roughness (Ra) of the surface of the coating layer formed in the manner described above is preferably in the range of 0.005 to 0.5 μm, more preferably 0.02 to 0.3 μm, most preferably 0.05 to 0.1 μm. When Ra is less than 0.005 μm, slipperiness of the film surface is unsatisfactory and there arise the problems in film workability, which can not inhibit the generation of wrinkles of the film during metallization or when the metallized polyester film is wound up. On the other hand, when Ra exceeds 0.5 μm, unevenness of the film surface becomes so large that when a capacitor is made by winding the metallized polyester film, spaces are formed between the wound and superposed films and induce corona discharge at the electrode ends to cause a decline of dielectric strength and capacitance of the obtained capacitor.

The thickness of the polyester film as a base film used in the present invention is preferably in the range of 0.5 to 25 μm. When the film thickness exceeds 25 μm, undesirable effect is given to the works such as winding up and hot pressing in the capacitor producing process. When the thickness is less than 0.5 μm, the loadable voltage is lowered, so that the influence by corona discharge on the film surface is repressed to lower the dielectric strength improving effect. Thus, in case where high dielectric strength is required, the thickness of the polyester film is preferably in the range of 5 to 25 μm.

Examples of the metal to be deposited on a polyester film in the present invention include aluminum, palladium, zinc, nickel, gold, silver, copper, indium, tin, chromium, titanium and the like. Of these metals, aluminum is most preferred. Oxides of these metals are also usable.

Deposition is usually performed by vacuum deposition, but other methods such as electroplating method and sputtering method may be used. The thickness of the deposited metal film is preferably in the range of 10 to 5,000 Å. The deposited metal film may be formed on one side or both sides of the coated polyester film. The deposited metal film may be subjected to a surface treatment or other coating treatment with a resin.

Two sheets of the thus obtained metallized polyester film are placed one on the other and wound up (in case of using a both-side metallized polyester film, the both-side metallized polyester film and other films including the polyester film used in the present invention are wound up together), or a multiplicity of the sheet are stacked (in case of using a both-side metallized polyester film, the both-side metallized polyester film and other .films including the polyester film used in the present invention or the polyester film having a coating layer used in the present invention are stacked), thereby producing a capacitor element, and this element is subjected to ordinary pertinent treatments such as hot pressing, taping, metallikon, voltage treatment, both-end sealing, lead wire attachment, etc., to obtain a capacitor. Other methods and techniques are also usable for making a capacitor with the metallized polyester film(s) of the present invention.

In view of long-term reliability, the capacitor of the present invention is preferably one of which the change ratio of capacitance after left in an atmosphere of a temperature of 60° C. and a humidity of 95% RH for 1,000 hours while applying a DC voltage of 60 V/μm between the electrodes is in the range of −10% to 10% preferably −7% to 7%, more preferably −5% to 5%.

The dynamic coefficient of friction between the coated polyester films used in the present invention (F/F μd) is preferably less than 0.8, more preferably less than 0.6, even more preferably less than 0.4, and the dynamic coefficient of friction between the metallized polyester film used in the present invention and a coated polyester film used in the present invention(F/MF μd) is preferably less than 0.8, more preferably less than 0.6, even more preferably less than 0.4.

When the value of F/F μd or F/MF μd is too large, the yield in the film and capacitor take-up steps is reduced, resulting in low productivity.

As described above, the capacitor of the present invention has an excellent moist heat resistance and shows an excellent long-term reliability, and thus the effect of the present invention in its industrial utilization is great.

EXAMPLES

The present invention is explained in more detail in the following Examples, however, it should be recognized that the scope of the present invention is not restricted to these Examples.

The evaluation methods used in the Examples are as described below. "Part" in the following Examples means "part by weight" unless otherwise noted.

(1) Analysis of alkali metal ions

Li, Na, K, Rb, Cs and Fr contents were determined by calibration chart method using an absorption-photometer (Spectro AA mfd. by Bariane Corp.).

(2) Center line average roughness (Ra)

Measured according to the method of JIS B0601-1976 using a surface roughness meter (SE-3F, mfd. by Kosaka Kenkyusho Co., Ltd.) under the following conditions: radius of the tip of stylus=2 μm; load=30 mg; cut-off value=0.08 mm; measuring length=0.8 mm. Measurement was made at 12 spots for each sample. The maximal and minimal values of the 12 measurement values were cut out, and the average of the remaining 10 measurement values was calculated and represented by Ra.

(3) Contact angle between waterdrop and film

The waterdrop contact angle between the sample film and distilled waterdrop was measured by a contact angle gauge (Model CA-DT-A, mfd. by Kyowa Kaimen Kagaku Co., Ltd.) under an atmosphere of a temperature of 23° C. and a humidity of 50% RH. The waterdrop contact angle was measured at two points (left and right) of each of the three samples, and the average of the six measurement values was calculated.

The waterdrop was 2 mm in diameter, and the value given one minute after dropping of water was read.

(4) Slipperiness F/F μd and F/MF μd

Two pieces of a film (15 mm in width×150 mm in length) were placed one on the other on a flat glass plate. Then a rubber plate was laid on the said pieces of film and a weight was further placed thereon so that the two pieces of film would be contacted with each other under a pressure of 2 g/cm². The two pieces of film were slided relative to each other at a rate of 20 mm/min and the produced frictional force was measured. The coefficient of friction at a point where the films were slided 5 mm relative to each other was expressed as dynamic coefficient of friction (F/F μd), and evaluation was made according to the following criterion.

In the same way, a metallized polyester film and a film were placed one on the other and dynamic coefficient of friction (F/MF μd) measured. Evaluation was made according to the following criterion.

| O: F/F ≦ 0.8 μd | O: F/MF ≦ 0.8 μd |
| X: F/F > 0.8 μd | X: F/MF > 0.8 μd |

(5) Thickness of polyester film

The weight W (g) of a 10 cm square film was measured by an electronic balance (mfd. by Mettler Corp.), and the film thickness (by gravimetric method) was determined from the following formula.

$$\text{Thickness } (\mu m) = 100 \cdot W/\rho$$

wherein

W: weight (g) of the 10 cm square film.

ρ: film density (g/cm³).

(6) Workability in capacitor producing process

Based on the yield in the capacitor winding step, evaluation was made according to the following criterion.

○: Yield≧90%

Δ: 70%≦Yield<90%

X: Yield<70%

It is desirable that workability is ○.

(7) Withstand voltage property (KV)

Determined according to JIS C-2319.

By using a 10 KV DC withstand voltage tester, the voltage was raised at a rate of 100 V/sec in an atmosphere of a temperature of 23° C. and a humidity of 50% RH, and the voltage which caused break of the film and consequent shortcircuiting was read.

(8) Change of capacitance

Each sample capacitor was left in an atmosphere of a temperature of 60° C. and a humidity of 95% RH for 1,000 hours while applying a DC voltage of 60 V/μm between the capacitor electrodes, and the change of capacitance was determined with the initial capacitance as reference. That is, the value obtained by subtracting the initial capacitance from the capacitance after 1,000-hour standing under the above condition, was divided by the initial capacitance and the quotient was expressed in a percentage.

Example 1

Production of polyester film

In accordance with the conventional method, polyethylene terephthalate containing 0.3% of silica particles of 1.2 μm in average diameter and having an intrinsic viscosity of 0.66 was melt-extruded at a temperature of 290° C. to form an amorphous sheet, and this amorphous sheet was stretched 4.2 times in the machine direction at a temperature of 90° C. Then, a coating solution composed of 95 parts ("parts" being weight of the solid content and hereinafter referring to solid content) of water-dispersible polyester polyurethane A having carboxylic acid ammonium salt as functional group (Hydrane AP40 produced by Dai-Nippon Ink & Chemicals Inc.) and 5 parts of silica sol having an average particle size of 0.07 μm, with water used as medium, was applied on both sides of the resultant film, and the coated film was stretched 3.9 times in the transverse direction at a temperature of 110° C. and heat-treated at a temperature of 230° C. to obtain a biaxially stretched polyester film with a coating layer, in which the thickness of the coating layer was 0.06 µm and the thickness of the base polyester film was 5 µm. As for the alkali metal contents in the coating solution, this coating solution contained Na in a concentration of 94 ppm and K in a concentration of 10.8 ppm (both calculated as the solid content). Other alkali metals were below the minimum limit of detection. The waterdrop contact angle of the coating layer was 63° and the center line average roughness (Ra) of the coating layer was 0.020 µm.

Manufacture of capacitor

By using a resistance-heating metal vapor-depositing apparatus, with the pressure in the vacuum chamber adjusted to be not more than $10^{-4}$ Torr, one side of the obtained film was metallized with aluminum to a thickness of 450 Å. In this operation, the polyester film was metallized in a striped pattern having the margins in the machine direction of the film (the strip having a metallized portion of 8 mm in width and a margin of 1 mm in width). The obtained metallized polyester film was slit into a tape having 4.5 mm in width such that each tape had a margin (unvapordeposited portion) of 1 mm in width at the left or right edge. The thus obtained metallized film showed excellent adhesion in the adhesion evaluation test.

Two of the thus obtained metallized polyester films, one having a left margin and the other having a right margin, were stacked together and wound up to obtain a winding. In this operation, two films were wound up with a positional shift relative to each other so that the metallized portion would protrude by 0.5 mm in the widthwise direction. The thus-obtained winding was hot-pressed under a pressure of 40 kg/cm$^2$ at a temperature of 140° C. for 5 minutes. After subjecting both end surface to metallikon, lead wires were attached thereto, and then there were formed a layer impregnated with a liquid bisphenol A epoxy resin and a sheathing with a minimum thickness of 0.5 mm by fusing a powdery epoxy resin to produce a film capacitor with an capacitance of 0.1 µF.

Comparative Example 1

The same procedure as Example 1 was carried out except that no coating solution was applied on the film to obtain a metallized polyester film capacitor.

Comparative Example 2

The same procedure as Example 1 was carried out except that a coating solution containing 100 parts of polyester polyurethane using water as medium was applied on the film to obtain a metallized polyester film capacitor.

Example 2

The same procedure as Example 1 was carried out except for using silica sol having an average particle size of 0.1 µm to obtain a metallized polyester film capacitor.

Example 3

The same procedure as Example 1 was carried out except that the coat thickness was 0.1 µm and the average particle size of the silica sol was 0.1 µm to obtain a metallized polyester film capacitor.

Example 4

The same procedure as Example 1 was carried out except for using the crosslinked polystyrene particles with an average particle size of 0.1 µm in place of silica sol to obtain a metallized polyester film capacitor.

Comparative Example 3

The same procedure as Example 1 was carried out except that the coating layer thickness was 3 µm to obtain a metallized polyester film capacitor.

Comparative Example 4

The same procedure as Example 1 was carried out except that the average particle size of the silica sol was 0.02 µm to obtain a metallized polyester film capacitor.

Comparative Example 5

The same procedure as Example 1 was carried out except that the coating solution was composed of 99.95 parts of polyurethane A and 0.05 parts of the particles to obtain a metallized polyester film capacitor.

Example 5

A coating solution composed of 95 parts of a water-dispersible polyester having sodium sulfonate as functional group (Plascoat RZ-124 produced by Goo Chemical Industries Co., Ltd.) and 5 parts of silica sol having an average particle size of 0.07 µm using water as medium was passed through a column of sulfonic acid-type cation exchange resin to prepare a coating solution containing Na in a concentration of 25 ppm and K in a concentration of 1.6 ppm (both calculated as solid content), with other alkali metals of less than the minimum limit of detection, and this coating solution was applied on the base film same as used in Example 1, followed by otherwise the same treatments as Example 1 to obtain a metallized polyester film capacitor.

Example 6

The same procedure as Example 1 was carried out except for using a coating solution comprising 95 parts of an acrylic resin (Julymer AT-M915 produced by Nihon Junyaku Co., Ltd.) mainly composed of methyl methacrylate, isobutyl methacrylate, acrylic acid, methacrylic acid and glycidyl methacrylate and having its carboxyl groups neutralized with ammonia to form the resin soluble in water and 5 parts of silica sol with an average particle size of 0.07 µm, with water used as medium, to obtain a metallized polyester film capacitor.

Comparative Example 6

The same procedure as Example 1 was carried out except for using a coating solution prepared by adding sodium chloride to the coating composition of Example 1 so that the coating solution would contain Na in a concentration of 2,000 ppm and K in a concentration of 10.8 ppm (both expressed as solid content), with other alkali metals of less than the minimum limit of detection and using water as medium, to obtain a metallized polyester film capacitor.

The coat thickness, coating solution composition and base film thickness in the above Examples and Comparative Examples are shown in Table 1, and the properties of the base films used and of the capacitors obtained are shown in Table 2.

TABLE 1

| | Thickness of the coating layer (t) μm | Coating solution | | | |
|---|---|---|---|---|---|
| | | Kind of particle | Particle diameter (D) μm | D/t | Particle content wt % |
| Example 1 | 0.06 | Silica | 0.07 | 1.17 | 5 |
| Comp. Example 1 | — | — | — | — | — |
| Comp Example 2 | 0.06 | — | — | — | — |
| Example 2 | 0.06 | Silica | 0.10 | 1.67 | 5 |
| Example 3 | 0.10 | Silica | 0.10 | 1.00 | 5 |

TABLE 1-continued

| Example 4 | 0.07 | Organic Particles | 0.10 | 1.43 | 5 |
|---|---|---|---|---|---|
| Comp. Example 3 | 3.00 | Silica | 0.07 | 0.02 | 5 |
| Comp. Example 4 | 0.06 | Silica | 0.02 | 0.33 | 5 |
| Comp. Example 5 | 0.06 | Silica | 0.07 | 1.17 | 0.06 |
| Example 5 | 0.06 | Silica | 0.07 | 1.17 | 5 |
| Example 6 | 0.06 | Silica | 0.07 | 1.17 | 5 |
| Comp. Example 6 | 0.06 | Silica | 0.07 | 1.17 | 5 |

| | Coating solution Metal content (ppm) | | | Thickness of base film (μm) |
|---|---|---|---|---|
| | Na | K | Other alkali metals | |
| Example 1 | 94.0 | 10.8 | Negligible 0 | 4.55 |
| Comp. Example 1 | — | — | — | 4.50 |
| Comp. Example 2 | 44.0 | 5.8 | Negligible 0 | 4.56 |
| Example 2 | 77.9 | 8.0 | Negligible 0 | 4.55 |
| Example 3 | 77.9 | 8.0 | Negligible 0 | 4.57 |
| Example 4 | 116 | 13.4 | Negligible 0 | 4.56 |
| Comp. Example 3 | 94.0 | 10.8 | Negligible 0 | 4.58 |
| Comp. Example 4 | 118 | 12.7 | Negligible 0 | 4.57 |
| Comp. Example 5 | 44.6 | 5.9 | Negligible 0 | 4.57 |
| Example 5 | 25.0 | 1.6 | Negligible 0 | 4.55 |
| Example 6 | 69.1 | 6.6 | Negligible 0 | 4.55 |
| Comp. Example 6 | 2000 | 10.8 | Negligible 0 | 4.55 |

TABLE 2

| | Base film | | | | | Capacitor | |
|---|---|---|---|---|---|---|---|
| | Ra (μm) | Water-drop contact angle | Slipperiness F/F μd | Slipperiness F/MF μd | Process work ability | With-stand voltage (KV/μm) | Change in capacitance Load (%) |
| Ex. 1 | 0.021 | 63° | O: 0.31 | O: 0.38 | O | 0.56 | 4.5 |
| Comp. Ex. 1 | 0.020 | 66° | O: 0.41 | O: 0.46 | O | 0.55 | −42.5 |
| Comp. Ex. 2 | 0.020 | 63° | O: 0.35 | X: 1.0< | Δ | 0.56 | 4.5 |
| Ex. 2 | 0.021 | 63° | O: 0.31 | O: 0.38 | O | 0.56 | 4.8 |
| Ex. 3 | 0.020 | 63° | O: 0.30 | O: 0.35 | O | 0.56 | 2.0 |
| Ex. 4 | 0.021 | 63° | O: 0.32 | O: 0.36 | O | 0.56 | 0.5 |
| Comp. Ex. 3 | 0.019 | 62° | X: 1.0< | X: 1.0< | x | 0.56 | 4.9 |
| Comp. Ex. 4 | 0.020 | 63° | O: 0.45 | X: 1.0< | Δ | 0.56 | 4.5 |
| Comp. Ex. 5 | 0.020 | 63° | O: 0.43 | X: 1.0< | Δ | 0.56 | 4.5 |
| Ex. 5 | 0.021 | 63° | O: 0.36 | O: 0.41 | O | 0.56 | 0.7 |
| Ex. 6 | 0.020 | 63° | O: 0.29 | O: 0.29 | O | 0.56 | 1.6 |
| Comp. Ex. 6 | 0.021 | 63° | O: 0.31 | O: 0.38 | O | 0.56 | −22.2 |

What is claimed is:

1. A metallized polyester film capacitor comprising:

a polyester film having a thickness of 0.5 to 25 μm;

a coating layer on at least one side of said polyester film, said coating layer having a surface whose center line average roughness is 0.005 to 0.5 μm, a waterdrop contact angle of not less than 60° and a thickness (t) of 0.01 to 2 μm, and containing 0.1 to 20 wt % of particles having an average diameter (D) that satisfies the following formula (I), $$0.5 \leq D/t \leq 3$$

and a metal layer on said coating layer, wherein the coating layer is located between the polyester film and the metal layer, and the coating layer has an alkali metal content of less than 500 ppm.

2. A film capacitor according to claim 1, wherein a binder resin of the coating layer is polyesters, polyurethanes, polyacrylics or a mixture thereof.

3. A film capacitor according to claim 2, wherein the binder resin is a water-soluble or water-dispersible resin having an anionic group.

4. A film capacitor according to claim 3, wherein the content of the anionic group is 0.05 to 8 wt %.

5. A film capacitor according to claim 1, wherein a particle size distribution factor ($d_{25}/d_{75}$) of the particles contained in the coating layer is not more than is 1.60.

6. A film capacitor according to claim 1, wherein the rate of change of capacitance of the capacitor after left in an atmosphere of a temperature of 60° C. and a humidity of 95% RH while applying a DC current of 60 V/μm between the capacitor electrodes is −10% to 10%.

7. A film capacitor according to claim 1, wherein a dynamic coefficient of friction between the coated polyester films and a dynamic coefficient of friction between the coated polyester film and the metallized polyester film are both not more than 0.8.

8. A film capacitor according to claim 1, wherein the coating layer comprises a polyester.

9. A film capacitor according to claim 1, wherein the coating layer comprises a polyurethane.

10. A film capacitor according to claim 1, wherein the coating layer contains 0.5 to 15% of the particles.

11. A film capacitor according to claim 1, wherein the coating layer contains 1% to 10% of the particles.

12. A film capacitor according to claim 1, wherein the particles comprise silica.

13. A film capacitor according to claim 1, wherein the particles comprise organic particles.

14. A film capacitor according to claim 1, wherein the coating layer has an alkali metal content of less than 200 ppm.

15. A metallized polyester film capacitor comprising:

a polyester film having a thickness of 0.5 to 25 μm;

a coating layer on at least one side of said polyester film, said coating layer having a surface whose center line average roughness is 0.005 to 0.5 μm, a waterdrop contact angle of not less than 60° and a thickness (t) of 0.01 to 2 μm, and containing 0.1 to 20 wt % of the particles which have an average diameter (D) that satisfies the following formula (I)

$$0.5 \leq D/t \leq 3$$

and a particle size distribution factor ($d_{25}/d_{75}$) of not more than 1.60; and a metal layer on at least one side of the polyester film having said coating layer wherein the coating layer is located between the polyester film and the metal layer, and the coating layer has an alkali metal content of less than 500 ppm, wherein the rate of change of capacitance of the capacitor after left in an atmosphere of a temperature of 60° C. and a humidity of 95% RH while applying a DC current of 60 V/μm between the capacitor electrodes is −10% to 10%, and a dynamic coefficient of friction between the coated polyester films and a dynamic coefficient of friction between the coated polyester film and the metallized polyester film is both not more than 0.8.

16. A film capacitor according to claim 15, wherein the ratio of the average diameter (D) to the thickness (t) is 0.7 to 2.5.

17. A film capacitor according to claim 15, wherein the particle size distribution factor ($d_{25}/d_{75}$) of the particles contained in the coating layer is not more than is 1.40.

18. A film capacitor according to claim 15, wherein the center line average roughness (Ra) of the surface of the coating layer is 0.02 to 0.3 μm.

19. A film capacitor according to claim 15, wherein the rate of change of capacitance of the capacitor after left in an atmosphere of a temperature of 60° C. and a humidity of 95% RH while applying a DC current of 60 V/μm between the capacitor electrodes is −7% to 7%.

20. A film capacitor according to claim 15, wherein a dynamic coefficient of friction between the coated polyester films and a dynamic coefficient of friction between the coated polyester film and the metallized polyester film are both not more than 0.6.

* * * * *